(12) United States Patent
Miyazaki

(10) Patent No.: US 9,135,536 B2
(45) Date of Patent: Sep. 15, 2015

(54) IMAGE PROCESSING APPARATUS AND IMAGE PROCESSING METHOD GENERATING BINARY DATA SPECIFYING DOT ARRANGEMENT IN A UNIT AREA OF A PRINT MEDIUM

(71) Applicant: CANON KABUSHIKI KAISHA, Tokyo (JP)

(72) Inventor: Shinichi Miyazaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 14/033,142

(22) Filed: Sep. 20, 2013

(65) Prior Publication Data

US 2014/0092403 A1 Apr. 3, 2014

(30) Foreign Application Priority Data

Oct. 1, 2012 (JP) ................................. 2012-219608

(51) Int. Cl.
*G06F 3/12* (2006.01)
*G06K 15/02* (2006.01)
*H04N 1/405* (2006.01)

(52) U.S. Cl.
CPC .......... *G06K 15/1836* (2013.01); *H04N 1/4051* (2013.01)

(58) Field of Classification Search
CPC ..... H04N 1/4053; H04N 1/4057; H04N 1/00; H04N 1/40068; H04N 1/4058; H04N 1/4092; G06K 15/1836; G06K 9/38

USPC ..................................................... 358/1.8, 1.1
See application file for complete search history.

(56) References Cited

U.S. PATENT DOCUMENTS

| | | | |
|---|---|---|---|
| 2002/0080377 A1* | 6/2002 | Tonami et al. | 358/1.9 |
| 2010/0060918 A1* | 3/2010 | Yamaguchi | 358/1.9 |
| 2012/0188582 A1* | 7/2012 | Yamaguchi et al. | 358/1.14 |

FOREIGN PATENT DOCUMENTS

| | | |
|---|---|---|
| JP | 2000-141617 | 5/2000 |
| JP | 2002-29097 | 1/2002 |

* cited by examiner

*Primary Examiner* — Martin Mushambo
(74) *Attorney, Agent, or Firm* — Fitzpatrick, Cella, Harper & Scinto

(57) ABSTRACT

Even in the case where input image data is binary data, dot arrangement appropriate for a printing apparatus is achieved to output a high quality image that suppresses an adverse influence such as density unevenness, stripes, or granular feeling. For this purpose, after the inputted binary data has been converted to multivalued data having lower resolution, a dot arrangement pattern that preliminarily specifies printing or non-printing for each of print pixels is set with being related to the multivalued data, and thereby new binary data is generated. At this time, the dot arrangement pattern is set to the dot arrangement appropriate for the printing apparatus, and therefore the high quality image that suppresses the adverse influence such as the density unevenness, stripes, or granular feeling can be outputted.

16 Claims, 13 Drawing Sheets

| LEVEL VALUE | 0 | | 1 | | 2 | | 3 | | 4 | |
|---|---|---|---|---|---|---|---|---|---|---|
| X / Y | 0 | 1 | 0 | 1 | 0 | 1 | 0 | 1 | 0 | 1 |
| 0 | | | | | | | | | | |
| 1 | | | | | | | | | | |

FIG.7

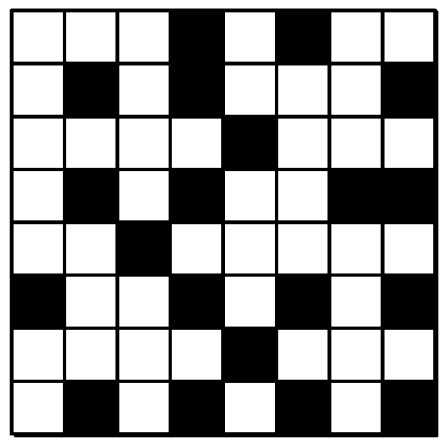
FIG.9A
| 1 | 2 | 1 | 1 |
|---|---|---|---|
| 1 | 1 | 1 | 2 |
| 1 | 2 | 1 | 1 |
| 1 | 1 | 2 | 1 |
FIG.9B
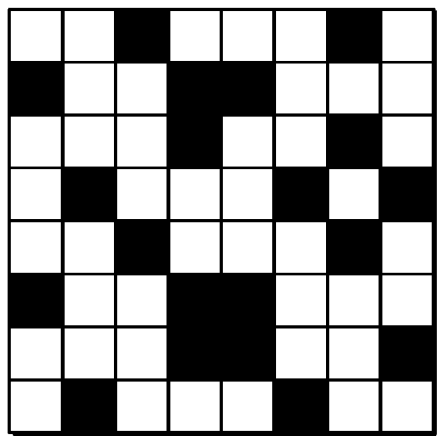
FIG.9C

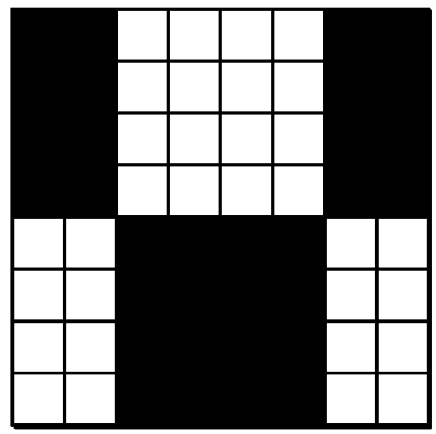
FIG.12A
| 4 | 0 | 0 | 4 |
|---|---|---|---|
| 4 | 0 | 0 | 4 |
| 0 | 4 | 4 | 0 |
| 0 | 4 | 4 | 0 |
FIG.12B
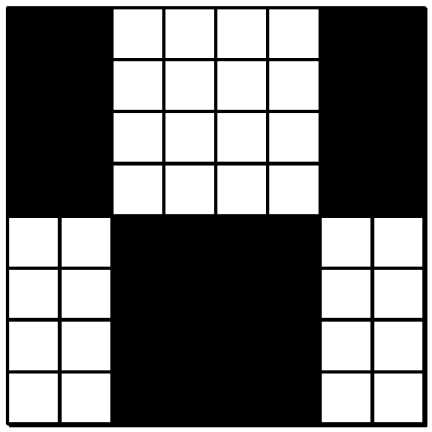
FIG.12C

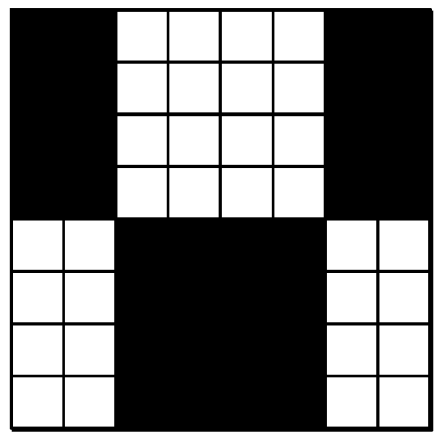
FIG.13A
FIG.13B
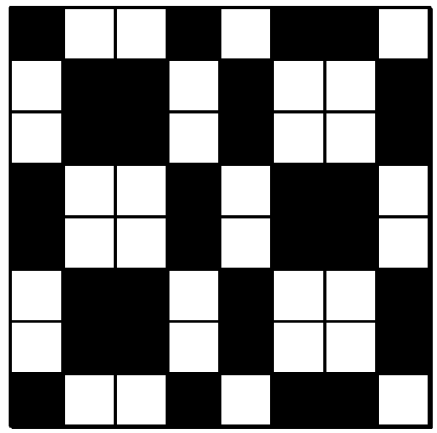
FIG.13C

IMAGE PROCESSING APPARATUS AND IMAGE PROCESSING METHOD GENERATING BINARY DATA SPECIFYING DOT ARRANGEMENT IN A UNIT AREA OF A PRINT MEDIUM

BACKGROUND OF THE INVENTION

1. Field of the Invention

The present invention relates to an image processing apparatus and image processing method for representing inputted image data by printing and non-printing of dots. In particular, the present invention relates to an image processing method for, in the case where inputted image data is binary data, performing printing with binary data that achieves dot arrangement appropriate for a printing apparatus.

2. Description of the Related Art

In recent years, a printing apparatus such as an inkjet one is compatible with pieces of input image data in various formats. For example, in the case of outputting a photograph, a poster, or the like, multivalued data photographed by a digital camera, such as RGB data, serves as the input image data for the printing apparatus. On the other hand, in the case of using the printing apparatus for the purpose of proving a print or the like, screened Tiff data (binary data) having been subjected to RIP (Raster Image Processor) serves as the input image data.

In the case of inputting RGB multivalued data, an image processing apparatus performs color conversion of the multivalued data to multivalued data (e.g., CMYK data) corresponding to ink colors used by a printing apparatus, and then converts to binary data corresponding to resolution of the printing apparatus. In this case, a method that performs multivalued quantization to the multivalued data having a smaller number of gradations (e.g., 5-values) than that of the inputted multivalued data, and then with use of a dot arrangement pattern that specifies printing or non-printing for each of pixels corresponding to the resolution of the printing apparatus, converts to the binary data is used.

In such a dot arrangement pattern, dot arrangement convenient for the printing apparatus can be prepared. Also, for the same multivalued quantized value, a plurality of dot arrangement patterns among which positions of printed pixels (dots) are made different is prepared, and depending on any of various conditions, from among the plurality of dot arrangement patterns, one can also be selected. Specifically, for example, to prevent a bias from occurring among the numbers of times individual printing elements print dots, or between the numbers of times of printing during forward and backward scans, the plurality of dot arrangement patterns can be sequentially selected.

Japanese Patent Laid-Open No. 2000-141617 discloses a method that, by randomly selecting one of a plurality of dot arrangement patterns on the basis of a random number having a predetermined bit number, avoids unevenness, stripes, or pseudo contours of an image caused by characteristics of a printing apparatus main body.

On the other hand, Japanese Patent Laid-Open No. 2002-29097 discloses a dot arrangement pattern and a method for selecting the dot arrangement pattern that, in the case of printing an odd raster and an even raster by different nozzle arrays, or printing an odd column and an even column during different scans, prevents a bias in the number of printed dots from occurring between the scans or the rasters.

By employing the method disclosed in Japanese Patent Laid-Open No. 2000-141617 or Japanese Patent Laid-Open No. 2002-29097, even in the case where conveyance unevenness specific to a printing apparatus, or print position displacement specific to a print head is present, dot arrangement patterns that prevent such an adverse influence from being noticeable can be prepared and order of the patterns can be controlled.

However, in the case where the image data inputted to the printing apparatus is binary data, arrangement of printed dots is already specified by the binary data. Accordingly, dot arrangement that can deal with an adverse influence specific to a printing apparatus as disclosed in Japanese Patent Laid-Open No. 2000-141617 or 2002-29097 cannot be achieved on a print medium, and therefore an adverse influence on an image, such as density unevenness, stripes, or granular feeling may be caused.

SUMMARY OF THE INVENTION

The present invention is made in order to solve the above-described problem. Therefore, an object of the present invention is to, even in the case where inputted image data is binary data, achieve dot arrangement appropriate for a printing apparatus to output a high quality image that suppresses an adverse influence such as density unevenness, stripes, or granular feeling.

In a first aspect of the present invention, there is provided an image processing apparatus for forming an image by printing dots on a print medium comprising: an obtaining unit configured to obtain first binary data that specifies printing or non-printing of dots in a unit area of the print medium at a predetermined resolution; a multiplying conversion unit configured to generate multivalued data indicating multivalued level corresponding to the number of dots to be printed in each of the unit areas of lower resolution than the predetermined resolution, according to the number of dots in the unit area consisting of a predetermined number of pixels each having the first binary data obtained by the obtaining unit; and a binarization unit configured to generate second binary data specifying dot arrangement in the unit area of the print medium at the predetermined resolution, according to the multivalued level of multivalued data generated by the multiplying conversion unit for each of the unit area and a dot arrangement pattern specifying arrangement of dots on the print medium corresponding to the multivalued level.

In a second aspect of the present invention, there is provided an image processing method for forming an image by printing dots on a print medium comprising: an obtaining step for obtaining first binary data that specifies printing or non-printing of dots in a unit area of the print medium at a predetermined resolution; a multiplying conversion step for generating multivalued data indicating multivalued level corresponding to the number of dots to be printed in each of the unit areas at lower resolution than the predetermined resolution, according to the number of dots in the unit area consisting of a predetermined number of pixels each having the first binary data obtained by the obtaining step; a binarization step for generating second binary data specifying dot arrangement in the unit area of the print medium at the predetermined resolution, according to the multivalued level of multivalued data generated by the multiplying conversion step for each of the unit area and a dot arrangement pattern specifying arrangement of dots on the print medium corresponding to the multivalued level.

Further features of the present invention will become apparent from the following description of exemplary embodiments (with reference to the attached drawings).

BRIEF DESCRIPTION OF THE DRAWINGS

FIG. 7 is a diagram illustrating dot arrangement patterns that are referred to by the binarization processing part;

FIGS. 9A to 9C are diagrams illustrating a situation where the binary data in the first embodiment is converted;

FIGS. 12A to 12C are diagrams illustrating a situation where the binary data in the second embodiment is converted; and FIGS. 13A to 13C are diagrams illustrating a comparative example for describing an effect of the second embodiment.

DESCRIPTION OF THE EMBODIMENTS

First Embodiment

Figure 1:
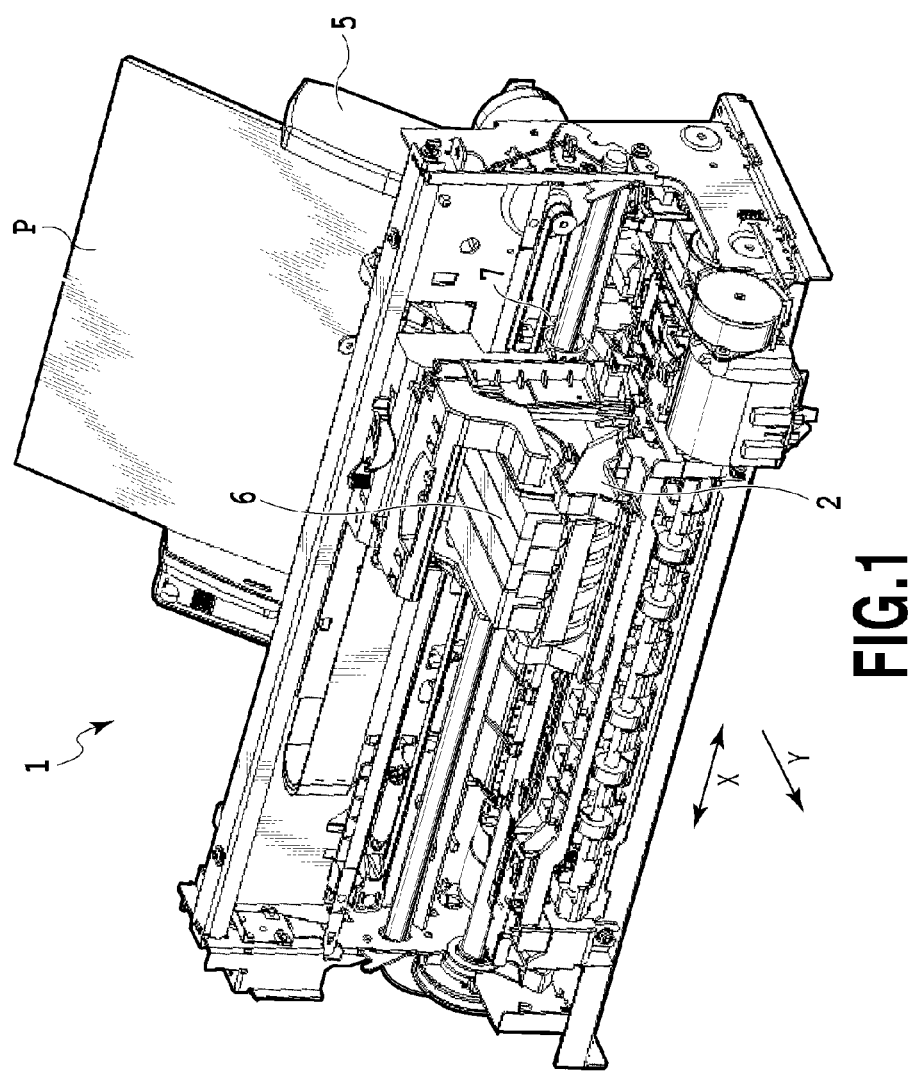
FIG. 1 is a perspective view illustrating an external configuration of an inkjet printing apparatus used in the present invention.

FIG. 1 is a perspective view illustrating an external configuration of an inkjet printing apparatus (hereinafter referred to as a printing apparatus) 1 used in the present embodiment.

An inkjet print head (hereinafter referred to as a print head) that can eject ink on the basis of an inkjet method is mounted on a carriage 2, and the carriage 2 is made to reciprocate in a direction indicated by an arrow X (main scanning direction). In the present embodiment, the carriage 2 is attached with four print heads respectively ejecting inks of magenta (M), cyan (C), yellow (Y), and black (K).

The carriage 2 is, in addition to the print heads, also mounted with four ink cartridges 6 respectively for supplying the inks to the print heads. Each of the four ink cartridges 6 can be attached/detached to/from the carriage 2, and configured to supply corresponding ink to a plurality of nozzles ejecting the ink of the same color.

A print medium P such as a print sheet is fed into the apparatus by a paper feeding mechanism 5, and conveyed to a position where printing can be performed by the print heads. During the movement of the carriage 2, the print heads discharge the inks according to print data, and thereby an image corresponding to one scan is printed on the print medium P. By alternately repeating such printing corresponding to one scan, and a conveyance operation of, by a distance corresponding to a print width of the print heads, conveying the print medium P in a direction indicated by an arrow Y (sub scanning direction), an image is formed on the print medium P.

Figure 2:
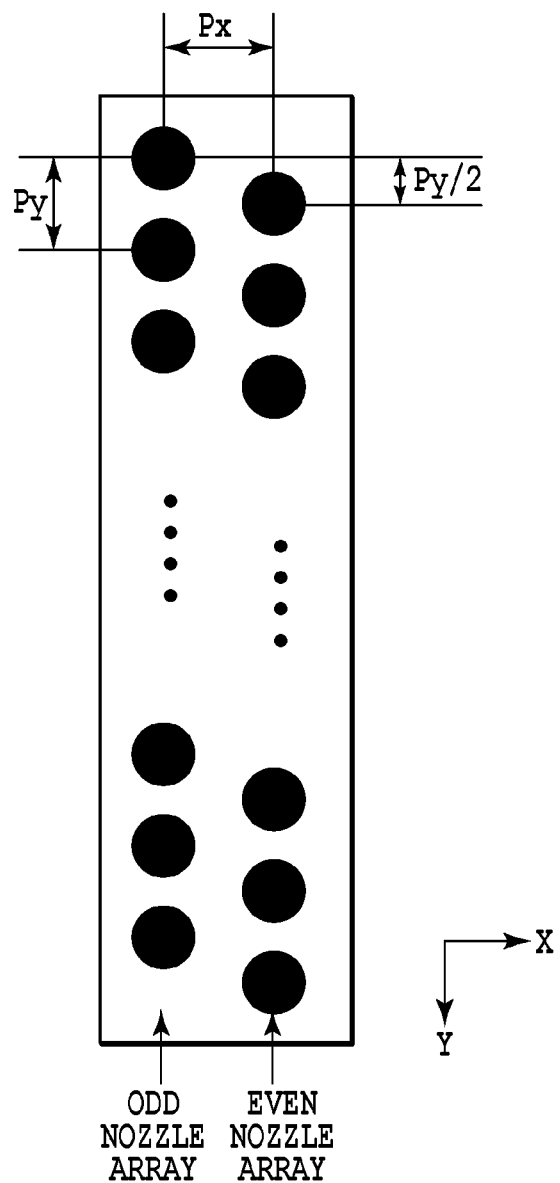
FIG. 2 is a diagram illustrating a nozzle array configuration in a print head.

FIG. 2 is a diagram illustrating a nozzle array configuration in one of the print heads. Each of an odd nozzle array and an even nozzle array has a plurality of nozzles arrayed at pitches of Py, and the two nozzle arrays are arranged with being displaced in the Y direction from each other by a distance of a half pitch (Py/2). By ejecting the inks from respective nozzles while moving such print heads in the X direction, dots can be printed on the print medium at the pitches of (Py/2) in the Y direction, i.e., at resolution twice print resolution of each of the nozzle arrays.

Also, in the printing apparatus of the present embodiment, in order to increase resolution in the X direction as well, column thinning printing is performed.

Figure 3:
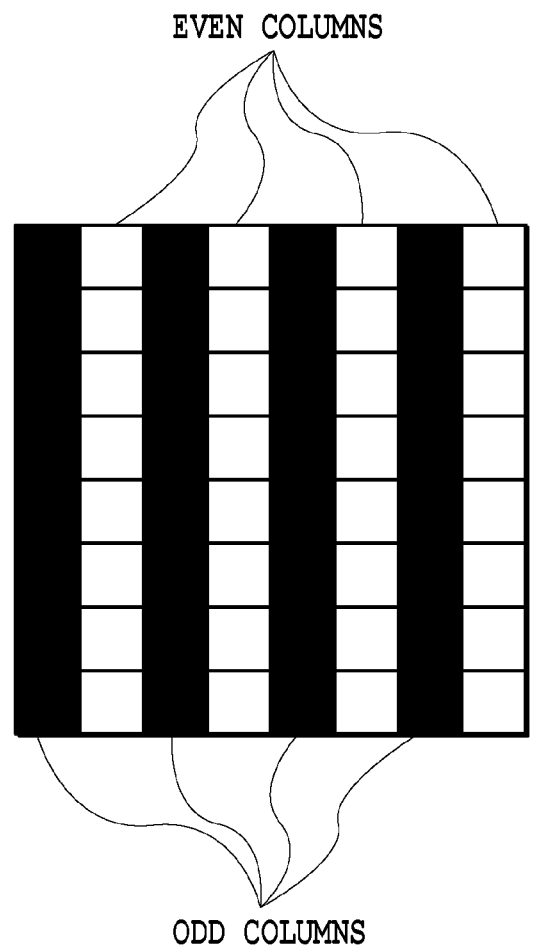
FIG. 3 is a diagram describing a column thinning printing method.

FIG. 3 is a diagram describing a column thinning printing method. The column thinning printing method refers to a printing method that, every two pixel arrays (columns), prints pixel arrays (columns) continuous in the sub scanning direction. For example, in the case of FIG. 3, odd columns indicated by black are printed during a first scan, and even columns indicated by white are printed during a second scan different from the first scan.

In general, in the case of an inkjet print head, after each nozzle has ejected ink, it takes some time for the ink to be refilled for the next ejection, and therefore a driving frequency of the print head is set to a frequency enough to sufficiently ensure such time. Also, from the set driving frequency and resolution of an image to be printed, a moving speed of a carriage is determined. Accordingly, as the print resolution is set higher, the carriage moving speed generally decreases.

However, in the case of performing the column thinning as illustrated in FIG. 3, it is only necessary for each nozzle to print every other pixel (column) during one scan, and therefore without changing a driving frequency of a print head, a carriage moving speed can be increased. Conversely, by performing multipass printing employing the column thinning, a higher resolution image in the main scanning direction can be printed in the same time.

It is assumed here that the present embodiment employs 2-pass bidirectional column thinning. That is, the odd columns in FIG. 3 are printed during a forward scan, then the print medium is conveyed in the Y direction by a distance shorter than a nozzle array, and subsequently the even columns are printed during a backward scan. In doing so, the carriage moving speed can be set approximately twice as compared with the case of not performing the column thinning.

As described, the present embodiment is configured to, by performing the 2-pass bidirectional column thinning while using the print heads illustrated in FIG. 2, output an image at resolution of 1200 dpi in both of the main and sub scanning directions (X and Y directions).

Figure 4:
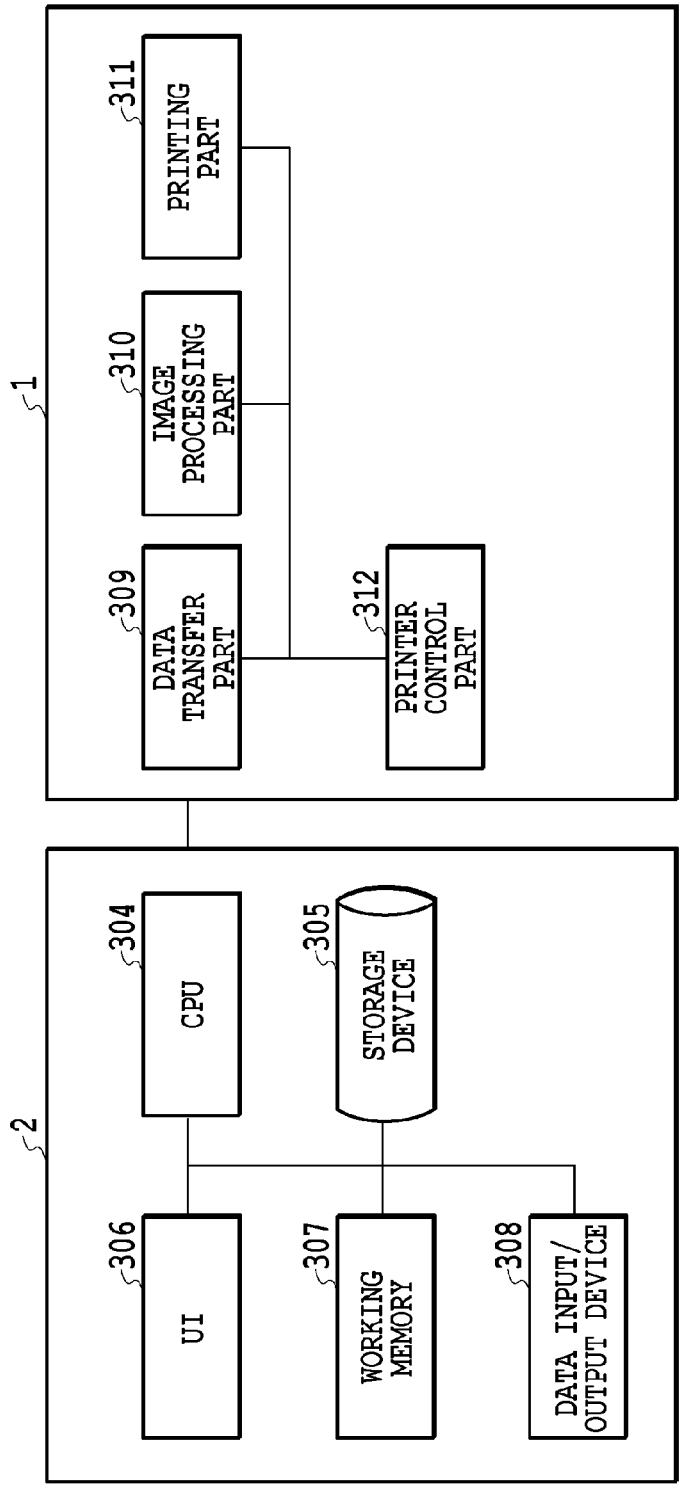
FIG. 4 is a diagram illustrating a printing system configured to include the printing apparatus and a host device.

FIG. 4 is a diagram illustrating a printing system configured to include the printing apparatus 1 and a host device 2. The printing apparatus 1 and the host device 2 are connected to each other through an interface such as a network, USB, or local bus.

In the host device 2, with making a working memory 307 serves as a work area, the CPU 304 performs various types of processing according to programs stored in a storage device 305. The storage device 305 can be configured by means typified by a hard disk or a flash ROM, and stores and manages, in addition to an OS for the printing apparatus 1, various types of application software, and pieces of parameter data necessary for the various types of processing. A user interface (UI) 306 includes input devices such as a keyboard and a mouse and a display device, and inputs/outputs information to/from a user. A data input/output device 308 is a device for inputting/outputting information such as image data.

The printing apparatus 1 mainly includes a data transfer part 309, printer control part 312, image processing part 310, and printing part 311, and operates according to a command transmitted from the host device 2. Print data transmitted from the host device 2 includes, in addition to image data, an image processing parameter specifying an image processing method for the image data, printer control data specifying carriage and conveyance operations at the time of printing, and other data. Upon receipt of such print data, the data transfer part 309 transmits the image data and the image processing parameter to the image processing part, and transmits the printer control data to the printer control part 312.

The image processing part 310 processes the received image data according to the also received image processing parameter to convert to binary data printable by the print heads, and transmits the binary data to the printing part 311. The printing part 311 is configured to include a head driver and the print heads, and according to the binary data, ejects the inks from the print heads at predetermined timing. On the other hand, according to the received printer control data, the printer control part 312 drives a carriage motor for moving the carriage 2 and a conveyance motor for conveying the print medium in the sub scanning direction. On the basis of the ink ejection by the printing part 311 and the movements of the carriage 2 and the print medium by the printer control part 312, an image based on the image data is printed on the print medium.

Figure 5:
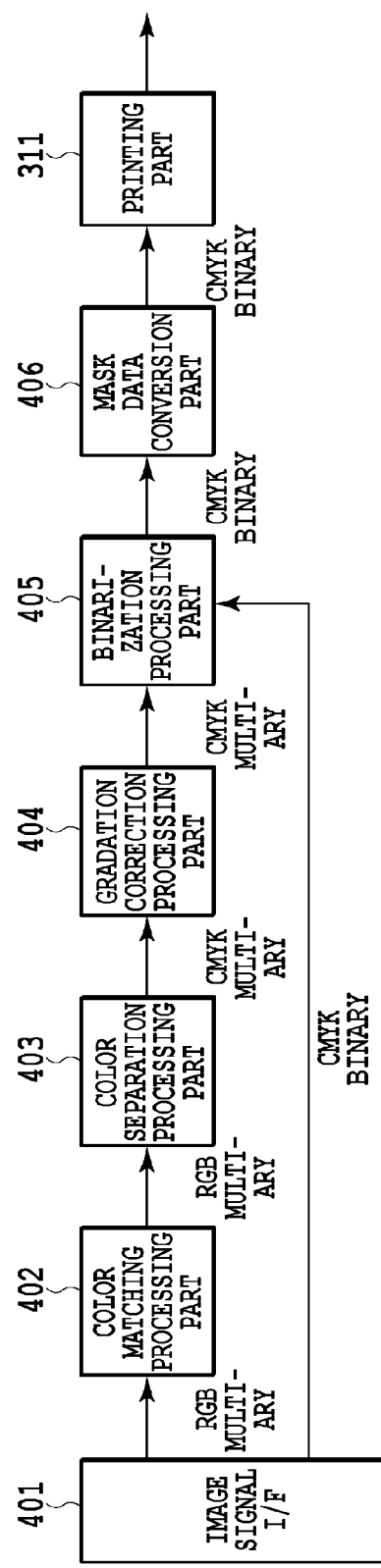
FIG. 5 is a block diagram illustrating steps of image processing performed by an image processing part.

FIG. 5 is a block diagram illustrating steps of image processing performed by the image processing part 310 of the present embodiment. In the present embodiment, it is assumed that two type of format of image data can be inputted to the printing apparatus 2, i.e., a 600-dpi (dot/inch) RGB multivalued (8-bit, 256-ary) format and a 1200-dpi binary (1 bit) format.

In the case where the input image data is 600-dpi RGB multivalued data, an image signal I/F 401 transmits the data to a color matching processing part 402. The color matching processing part 402 performs a process of mapping s-RGB space independent of the printing apparatus 1 to RGB color space representable by the printing apparatus 1. Specifically, a three-dimensional lookup table that maps an RGB signal combination in the s-RGB space to an RGB signal combination in the color space of the printing apparatus one-on-one is used to convert the 8-bit 256-levels RGB data to RGB data that is also 8-bit 256-levels.

The RGB data after the color matching process is converted by a color separation processing part 403 to 8-bit 256-levels CMYK data corresponding to the ink colors used by the printing apparatus. In this case as well, a prepared three-dimensional lookup table can be used.

Further, a gradation correction processing part 404 performs a conversion process of each of C, M, Y, and K of the multivalued density data such that gradation density represented on the print medium has linearity. Specifically, a one-dimensional lookup table prepared for each print medium type or each of the ink types is used to convert each of the elements of the 8-bits 256-levels CMYK data to CMYK data that is also 8-bit 256-levels.

In a subsequent binarization processing part 405, the 8-bit 256-levels CMYK data is converted by a 2-step quantization process to 1-bit binary data specifying printing (1) or non-printing (0). Specifically, first, by a typical multivalued error diffusion method or the like, the 8-bit 256-levels 600-dpi CMYK data is converted to 3-bit 5-levels 600-dpi CMYK data to reduce the gradation levels (gradation level reducing process as a first quantization process). Then, by using prepared dot arrangement patterns, the 3-bit 5-levels 600-dpi CMYK data is converted to the 1-bit 1200 dpi binary CMYK data (dot data generating process as a second quantization process). The binarization process here will be described later in detail.

On the other hand, in the case where the input image data is 1200-dpi binary data, the image signal I/F 401 directly transfers the first binary data to the binarization processing part 405. The first binary data already specifies the printing (1) or non-printing (0) for each of 1200-dpi pixels; however, the binarization processing part 405 makes a correction to an array of printing (1) or non-printing (0) to provide an output to a mask data conversion part 406 as new second binary data. This process will also be described later in detail.

Even though the input image data is the 600-dpi RGB multivalued data or the 1200-dpi binary data, data outputted from the binarization processing part 405 is the 1200-dip CMYK binary data, which is inputted to the mask conversion part 406. The mask conversion part 406 uses a preliminarily stored mask pattern to distribute the 1200-dpi CMYK binary data to binary data to be printed during each print scan. In the case of performing the 2-pass bidirectional multipass printing while performing the column thinning as in the present embodiment, by using the mask pattern as illustrated in FIG. 3, the 1200-dpi CMYK binary data is distributed to the binary data to be printed during each scan.

After that, the print scan-based binary data is transmitted to the printing part 311, and the print heads eject the inks at predetermined timing during a predetermined print scan.

Figure 6:
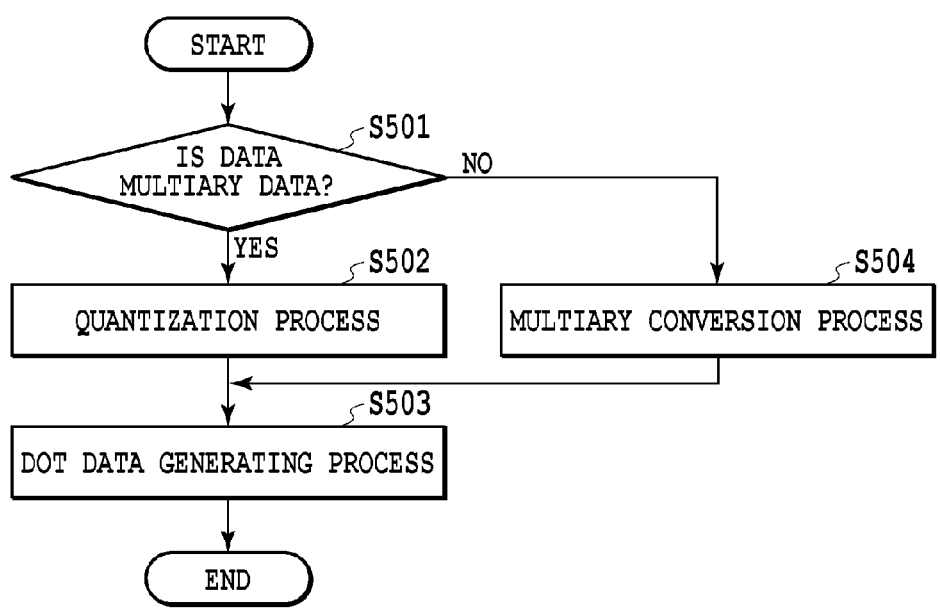
FIG. 6 is a flowchart for describing steps of a binarization process performed by a binarization processing part.

FIG. 6 is a flowchart for describing steps of the binarization process performed by the binarization processing part 405 in FIG. 5.

When image data is inputted, the binarization processing part 405 first determines in Step S501 whether the data is multivalued data or binary data. In the case of the multivalued data, the flow proceeds to Step S502, whereas in the case of the binary data, the flow proceeds to Step S504.

In Step S502, the binarization processing part 405 performs the gradation level reducing process as a first quantization process. Specifically, the 600-dpi 256-level data is converted to 600-dpi 5-level data having a smaller number of gradations. The process at this time may be, as already described, based on a typical multivalued error diffusion method, or based on another method. Even though any method is employed, the 600-dpi 256-level CMYK data is converted to the 600-dpi 5-level CMYK data indicating any of levels 1 to 4.

In Step S503, the binarization processing part 405 performs the dot data generating process as a second quantization process. Specifically, by referring to preliminarily stored dot arrangement patterns, the 600-dpi 5-level data from the gradation level reducing process is converted to 1200-dpi binary data.

Figure 7:
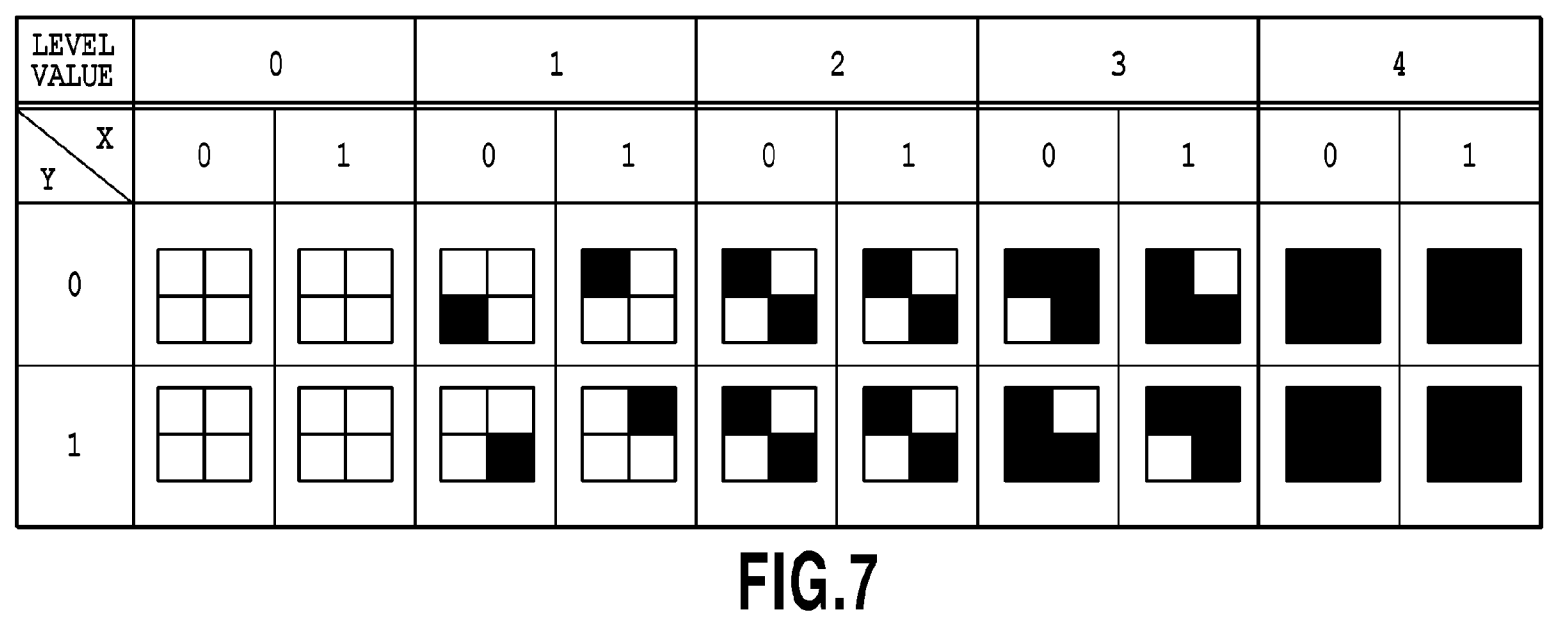

FIG. 7 is a diagram illustrating dot arrangement patterns referred to by the binarization processing part 405. In the diagram, each square corresponds to one 1200-dpi pixel area, and an area constituted by 2×2 squares corresponds to one 600-dpi pixel area. A level value represents a value from the gradation level reducing process, and is a value of any of levels 0 to 4

In a 4×4 area, a square indicated by black represents a pixel to be printed with a dot, whereas a square indicated by white represents a pixel not to be printed with a dot, and it turns out that as the level number is increased, the number of pixels to be respectively printed with dots increases. For example, when focusing on the level 1, only one pixel in the 2×2 pixel area is black (printed pixel); however, a position of the printed pixel can be determined in four ways. In the present embodiment, it is assumed that four types of dot arrangement patterns among which printed pixel positions are different as described are prepared for each of the levels, and alternately used in the main or sub scanning direction (X) or (Y) of the print medium. Such dot arrangement patterns are preliminarily stored in a memory of the printing apparatus 1.

Figures 8A, 8B:
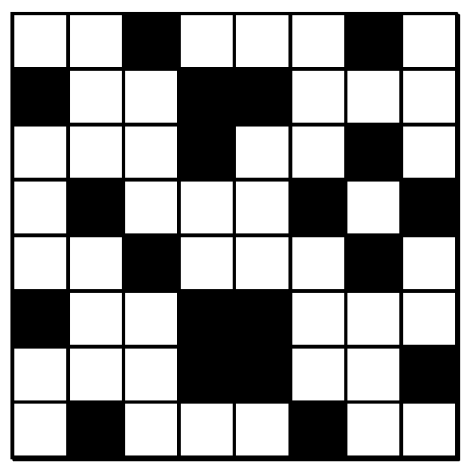
FIGS. 8A and 8B are diagrams illustrating a situation of converting quinary data to binary data.

FIGS. 8A and 8B are diagrams illustrating a situation of, in Step S503 in FIG. 6, converting the 600-dpi 5-level data to the 1200-dpi binary data according to the dot arrangement patterns illustrated in FIG. 7. FIG. 8A illustrates an example of a level value that each of 600-dpi pixels has, and FIG. 8B illustrates a binarization result (printing (black) or non-printing (white)) in each of 1200-dpi pixels in the same area. It turns out that in dependence upon a level value and a corresponding pixel position (XY coordinates), one corresponding dot arrangement pattern from among the plurality of patterns illustrated in FIG. 7 is arranged.

Returning to FIG. 6, in the case where in Step S501, it is determined that the input image data is the binary data, in Step S504, the binarization processing part 405 performs multiplying conversion of the 1200-dpi binary data to the 600-dpi five-level data. Further, subsequently, by referring to the dot arrangement patterns in FIG. 7, the 600-dpi 5-level data after the multivalued quantization is converted to the 1200-dpi binary data.

FIGS. 9A to 9C are diagrams respectively illustrating the 1200-dpi binary data inputted to the binarization processing part 405, the 600-dpi five-level data after the multiplying conversion process, and the 1200-dpi binary data after the binarization process.

When the first 1200-dpi binary data as in FIG. 9A is inputted, the binarization processing part 405 divides the first binary data with treating 2×2 as a unit area, and counts the number of printed dots (black) in each unit area. In this case, each unit area corresponds to one 600-dpi pixel area. In the case where a count value is 0, a level value of a corresponding pixel is set to 0; in the case where the count value is 1, the level value is set to 1; in the case where the count value is 2, the level value is set to 2; in the case where the count value is 3, the level value is set to 3; and in the case where the count value is 4, the level value is set to 4. FIG. 9B illustrates a situation where the level value of each 600-dpi pixel is set as a result of the counting as described.

Further, by referring to the dot arrangement patterns in FIG. 7, the binarization processing part 405 converts such 600-dpi 5-level data to the second 1200-dpi binary data. FIG. 9C illustrates the second 1200-dpi binary data obtained in this manner.

As already described, in the present embodiment, the print heads each configured to include the two nozzle arrays as illustrated in FIG. 3 are used to perform the 2-pass bidirectional multipass printing while performing the column thinning. That is, in a 1200-dpi image area, if among pieces of column data arrayed in the X direction, odd columns are printed during a forward scan, even columns are printed during a backward scan. Also, if among pieces of raster data arrayed in the Y direction, odd rasters are printed by the odd nozzle arrays, even rasters are printed by the even nozzle arrays. In such a situation, if the number of printed dots is biased to any ones of the odd and even columns, the number of times of ejection by the print heads is biased to any one of the forward and backward scans, and therefore an adverse influence on an image, such as density unevenness, is concerned. Also, if the number of printed dots is biased to any ones of the odd and even rasters, the number of times of ejection by the print heads is biased to any ones of the odd and even nozzle arrays, and therefore a reduction in lifetime of each of the print heads is concerned. That is, in order to avoid both of the biases, it is preferable to distribute pieces of print data between the odd and even columns and between the odd and even rasters as equally as possible in number.

In such a situation, in the 2×2 1200-dpi pixel areas of the dot arrangement patterns (FIG. 7) used in the present embodiment, the present embodiment is adapted such that printed pixels (black) are equally distributed between the odd and even columns and between the odd and even rasters. Also, even though the input image data is the multivalued data or the binary data, the present embodiment is configured to, ultimately, according to such dot arrangement patterns, generate ejection data.

Referring to FIGS. 9A to 9C again in order to describe an effect of the present embodiment, in the first binary data illustrated in FIG. 9A, a ratio in the number of printed pixels between the odd columns and the even columns is 15:5; however, in the second binary data illustrated in FIG. 9C, the ratio is 10:10. Also, in the first binary data illustrated in FIG. 9A, a ratio in the number of printed pixels between the odd rasters and the even rasters is 15:5; however, in the second binary data illustrated in FIG. 9C, the ratio is 9:11. In the case of performing a print operation directly with the first binary data illustrated in FIG. 9A, a bias in the number of times of ejection occurs between the odd nozzle array and the even nozzle array, and also occurs between the forward scan and the backward scan. On the other hand, in the case of performing the print operation with the second binary data illustrated in FIG. 9C, the bias in the number of times of ejection does not occur between the odd nozzle array and the even nozzle array or between the forward scan and the backward scan, and therefore density unevenness and the reduction in lifetime of each of the print heads can be reduced.

In other words, a configuration as in the present embodiment enables dot arrangement patterns in which printed pixels (black) are equally distributed between odd columns and even columns and between odd rasters and even rasters to be prepared in accordance with a configuration of print heads or a printing method to be used. Also, independent of a format of the input image data, printing can be performed according to the dot arrangement patterns that are, as described, prepared with having arrangement appropriate for the printing apparatus, and therefore an image suppressing density unevenness or stripes can be stably outputted.

Second Embodiment

In the present embodiment as well, the printing apparatus and image processing illustrated in FIGS. 1 to 6 are employed. However, it is assumed that input image data received by the printing apparatus 1 of the present embodiment is twofold, i.e., 300×600-dpi RGB 256-level data having lower resolution than those in the first embodiment and 1200-dpi CMYK binary data. Also, in the binarization processing part 405 of the present embodiment, for each of the formats of the input image data, dot arrangement patterns having a different configuration are prepared. Specifically, in the case where the input image data is the 1200-dpi binary data, first dot arrangement patterns having a 2×2 configuration are used, whereas in the case where the input image data is the 300×600-dpi 256-level data, second dot arrangement patterns having a 4×2 configuration are used.

In the present embodiment, in Step S502 of FIG. 6, the binarization processing part 405 converts the 300×600-dpi RGB 256-level data to 300×600-dpi 9-level data to obtain CMYK data indicating any of levels 0 to 8.

Figure 10:
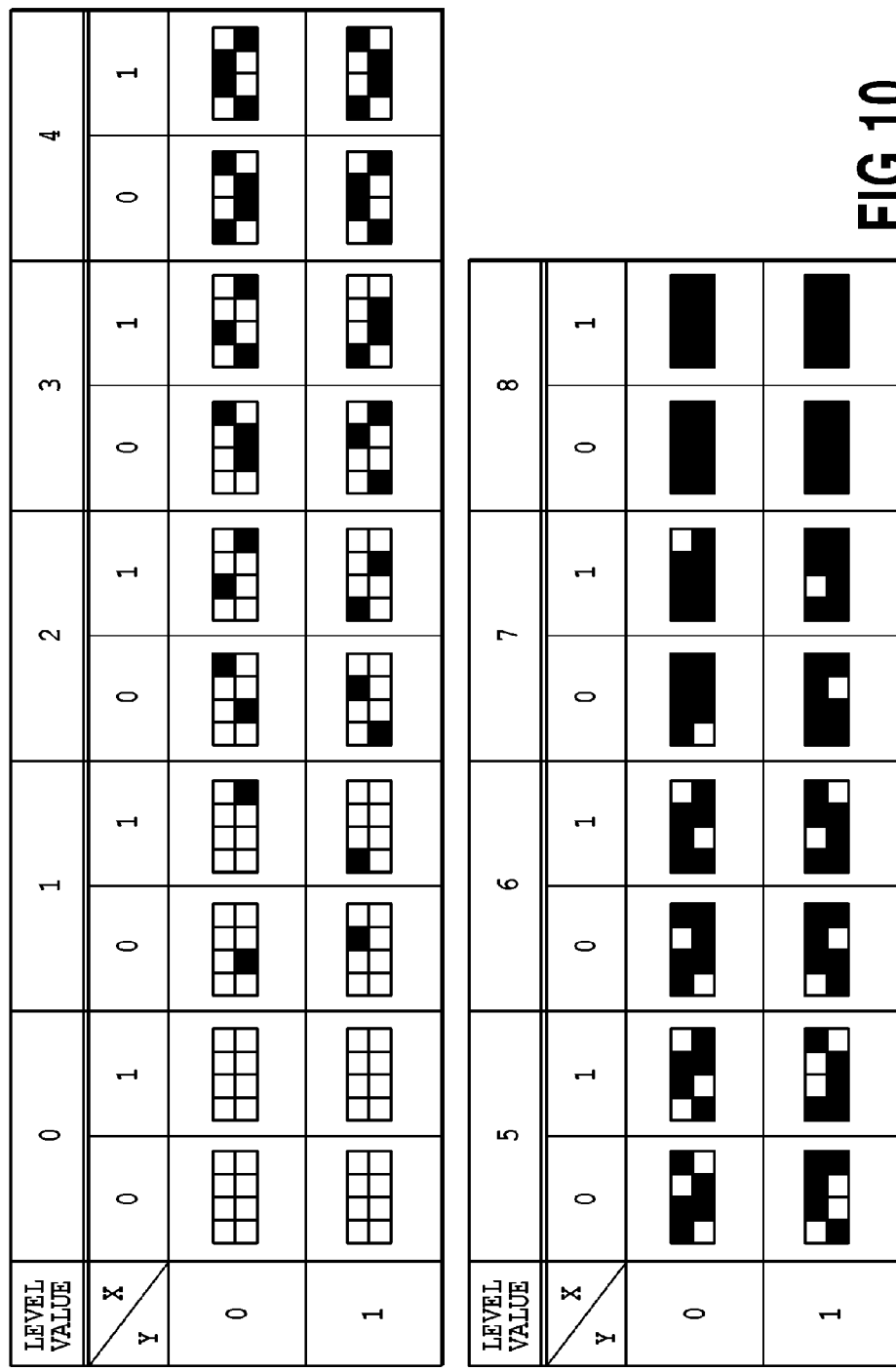
FIG. 10 is a diagram illustrating second dot arrangement patterns that are referred to in a second embodiment.

FIG. 10 is a diagram illustrating second dot arrangement patterns that are, in Step S503, referred to by the binarization processing part 405 in the case where the input image data is the 300×600-dpi data. As in FIG. 7, each square corresponds to one 1200-dpi pixel area, and an area constituted by 4×2 squares corresponds to one 300×600-dpi pixel area. A level value represents a reduced value from the gradation level reducing process, and is any of values of levels 0 to 8. In the present embodiment as well, four types of dot arrangement patterns among which positions of printed pixels are mutually different are prepared for each of the levels, and alternately used in the main and sub scanning directions (X and Y) of a print medium.

In the first embodiment, the input resolution is 600×600 dpi, and therefore a size of the dot arrangement patterns is 2×2; however, in the present embodiment, the input resolution is 300×600 dpi, and therefore a size of the dot arrangement patterns is 4×2. As described, as resolution of input image data becomes lower as compared with the print resolution of the printing apparatus, dot arrangement patterns having a larger size are required.

Figures 11A, 11B:
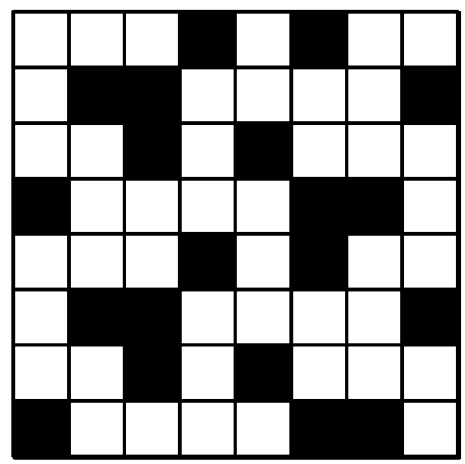
FIGS. 11A and 11B are diagrams illustrating a situation of converting nonary data to binary data.

FIGS. 11A and 11B are diagrams illustrating a situation of, in Step S503 of FIG. 6, according to the dot arrangement patterns illustrated in FIG. 10, converting the 300×600-dpi 9-level data to 1200-dpi binary data. FIG. 11A illustrated an example of a level value that each 300×600-dpi pixel has, whereas FIG. 11B illustrates a result (printing (black) or non-printing (white)) after the binarization in each 1200-dpi pixel in the same area. In dependence upon a level value and a corresponding pixel position (XY coordinate), one corresponding dot arrangement pattern from among the plurality of patterns illustrated in FIG. 10 is arranged.

On the other hand, FIGS. 12A to 12C are diagrams respectively illustrating the first 1200-dpi binary data inputted to the binarization processing part 405 of the present embodiment, 600-dpi five-level data after the multiplying conversion process, and second 1200-dpi binary data after the binarization process. In the present embodiment as well, in the case where the input image data is the 1200-dpi binary data, in the same manner as that in the first embodiment, the binarization process is performed. That is, the binarization processing part 405 divides the first binary data with treating 1200-dpi 2×2 as a unit, and the number of printed dots (black) in each unit area is counted, and according to a count value, a level value of each 600-dpi pixel is set. FIG. 12B illustrates a level value of each pixel, which is, in the case where the data as illustrated in FIG. 12A is inputted, obtained as a result of the counting. Subsequently, the binarization processing part 405 refers to the first dot arrangement patterns illustrated in FIG. 7 to thereby obtain the second binary data as illustrated in FIG. 12C from such 600-dpi five-level data. As described, in the present embodiment, in dependence upon resolution of the input image data, a set of dot arrangement patterns to be used is changed.

FIGS. 13A to 13C are diagrams illustrating an example of the present embodiment. This example illustrates a state of, in the case where the input image data is 1200-dpi binary data, using the second dot arrangement patterns (FIG. 10) that are the same as those used in the case where the input image data is 300×600-dpi multivalued data.

FIG. 13A illustrates the same first binary data as that of FIG. 12A. In the case of, on such 1200-dpi binary data, performing the multiplying conversion process for using the second dot arrangement patterns, binary data area is divided with 4×2 corresponding to one 300×600-dpi pixel area being treated as a unit, and the number of printed dots in each unit area is counted. FIG. 13B illustrates a situation where a level value of each 300×600-dpi pixel is set as a result of such counting. Subsequently, by referring to the second dot arrangement patterns illustrated in FIG. 10, a dot pattern as illustrated in FIG. 13C is obtained.

When comparing binary data of FIG. 13C with that of FIG. 12C of the present embodiment, the both have no bias in the number of times of ejection between the even nozzle array and the odd nozzle array, or between the even rasters and the odd rasters, and the same effect as that of the first embodiment is obtained. However, in FIG. 12C employing the first dot arrangement patterns, a dot arrangement state is not changed from the input image data illustrated in FIG. 12A. On the other hand, regarding binary data of FIG. 13C that is obtained by employing the second dot arrangement patterns, a dot arrangement state is changed from the inputted image data of FIG. 13A. Such dot arrangement of FIG. 12 is preferable because of preventing the dot arrangement from changing from inputted image data.

The dot arrangement patterns for equally distributing printed pixels between the even columns and the odd columns or between the even rasters and the odd rasters does not particularly require a large size, and about 2×2 is enough. Accordingly, even the printing apparatus inputted with low resolution multivalued data can output high quality image while minimizing the loss of reproducibility of image information by using the first dot arrangement patterns having a small size for high resolution binary data as in the present embodiment.

Note that in FIG. 2, the print head provided with two arrays consisting of the odd nozzle array and the even nozzle array is taken as an example to provide the description; however, the present invention can also have three or more nozzle arrays to print an image at resolution equal to or more than three times a nozzle pitch of each of the nozzle arrays. Further, the present invention can also perform not the column thinning every two columns as illustrated in FIG. 3 but column thinning every three or more columns. In either case, as compared with any of the above-described embodiments, an image can be printed at higher resolution. In this case, in order to average the number of times of ejection between the respective nozzle arrays or between the respective print scans as in each of the above-described embodiments, for dot arrangement patterns prepared for binary input image data, an area corresponding to a multiple of the number of nozzle arrays or the number of print scans is preferably prepared.

Also, the number of types of dot arrangement patterns for the same level value does not have to be four, and the present invention can also be configured to prepare many more patterns or fewer patterns.

Also, in each of the above-described embodiments, the 2-pass bidirectional multipass printing with performing the column thinning is assumed; however, it should be appreciated that the present invention is not limited to such a printing method. Multipass printing not involving the column thinning is also possible, or unidirectional printing is also possible. Further, various print modes corresponding to the types of print media and the types of images can also be prepared to use a different set of dot arrangement patterns for each of the print modes. It should be appreciated that the present invention can also configure a printing apparatus having both of functions of the above-described first and second embodiments.

Meanwhile, in each of the above-described embodiments, the dot arrangement patterns for equalizing the number of times of ejection between the respective print scans and between the respective nozzle arrays; however, the present invention is not limited to the dot arrangement patterns for accomplishing such an object. For example, texture appearing on an image in dependence upon characteristics of a conveyance mechanism or a carriage moving mechanism may be or may not be easily noticeable depending on dot arrangement, and therefore a set of dot arrangement patterns preferable for the printing apparatus is determined for various reasons. Regardless of any object, if sets of dot arrangement patterns for achieving dot arrangement preferable for the printing apparatus can be prepared to, depending on a format of input image data, apply an appropriate set of dot arrangement patterns, the present invention can produce the effect thereof.

Further, in each of the above-described embodiments, described is the content that the printing system illustrated in FIG. 4 is used to, in the image processing part of the printing apparatus 1, perform the series of distinctive image processing steps of the present invention; however, the present invention is not limited to such a configuration. The present invention may be configured such that part or all of the above-described image processing steps are performed in the host device, and in this case, a set of system also including the host device serves as an image processing apparatus of the present invention.

Further, in each of the above-described embodiments, described is the content that the binarization processing part 405 detects a format of the input image data, and depending on a result of the detection, makes subsequent processing steps different; however, the present invention is not limited to such steps. For example, the present invention can also first detect a format of image data outputted from the host device, and perform the image processing after reception in steps independent for each format.

The object of the present invention is also accomplished in such a manner that a storage medium storing a program code realizing the above-described functions is supplied to a system or a device, and a computer (CPU or MPU) of the system or device reads the program code stored in the storage medium to execute the program code. In this case, the program code itself read from the storage medium realizes the functions of the above-described embodiments, and therefore a program itself or the storage medium storing the program code constitutes the present invention.

As the storage medium for supplying the program code, for example, a floppy disk (registered trademark), hard disk, optical disk, magneto-optical disk, CD-ROM, CD-R, magnetic tape, non-volatile memory card, ROM, or the like can be used. Also, the present invention includes not only the case of executing the program code read by a computer to thereby realize the above-described functions, but also the case where, on the basis of instructions by the program code, an OS or the like running on a computer performs part of actual processing.

Further, the present invention also includes a configuration in which the program code read from the storing medium is written in a memory that is provided on a function expansion board inserted into a computer, or provided in a function expansion unit connected to a computer. In this case, on the basis of the instructions by the program code, a CPU or the like provided on the function expansion board or in the function expansion unit performs part or whole of the actual processing, and the processing realizes the functions of the above-described embodiments.

Method for supplying the program may include a method that uses a browser of a client computer to connect to an Internet homepage, and downloads the computer program of the present invention, or a compressed file including automatic install function from the homepage to a recording medium. The method for supplying the program can also be realized by dividing the program code constituting the program of the present invention into a plurality of files, and downloading the respective files from different homepages. That is, a WWW server that makes a plurality of users download the program files for realizing functional processing of the present invention on a computer also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-219608, filed Oct. 1, 2012, which is hereby incorporated by reference herein in its entirety.

What is claimed is:

1. An image processing apparatus for forming an image by printing dots on a print medium comprising:
an obtaining unit configured to obtain first binary data that specifies printing or non-printing of dots in a unit area of the print medium at a predetermined resolution;
a multiplying conversion unit configured to generate multivalued data indicating multivalued level corresponding to a number of dots to be printed in each of the unit areas of lower resolution than the predetermined resolution, according to the number of dots in the unit area of the print medium consisting of a predetermined number of pixels each having the first binary data obtained by the obtaining unit; and
a binarization unit configured to generate second binary data specifying dot arrangement in the unit area of the print medium at the predetermined resolution, according to the multivalued level of multivalued data generated by the multiplying conversion unit for each of the unit area and a dot arrangement pattern specifying arrangement of dots on the print medium corresponding to the multivalued level.

2. The image processing apparatus according to claim 1, wherein
the multiplying conversion unit counts the number of pieces of data indicating the printing dot in the unit area of the print medium, and thereby generates the multivalued data corresponding to the unit area according to the first binary data.

3. The image processing apparatus according to claim 1, wherein
regarding the dot arrangement pattern, a plurality of dot arrangement patterns among which an array of the printing or the non-printing is specified different for a same multivalued level of the multivalued data is prepared, and
the binarization unit sets one of the plurality of dot arrangement patterns in dependence upon the multivalued data and a position of the unit of the print medium area having said multivalued data.

4. The image processing apparatus according to claim 1, wherein
dots are printed on the print medium by ejecting ink from a nozzle array, in which a plurality of nozzles for ejecting ink to print dots on the print medium are arranged in a predetermined direction, on the basis of the second binary data generated by the binarization unit while moving the nozzle array in a direction crossing to the predetermined direction relative to the print medium,
the nozzle array has odd nozzle array and even nozzle array which are arranged in a direction crossing to the predetermined direction: the odd nozzle array printing for odd-numbered rasters of the predetermined direction among a plurality of rasters each of which consists of pixels arranged in a direction corresponding to the crossing direction at the predetermined resolution: and the even nozzle array printing for even-numbered rasters, and the binarization unit generates the second binary data according to the multivalued level and the dot arrangement pattern such that the number of pixels printed by the odd nozzle array and that of pixels printed by the even nozzle array are substantively-equal.

5. The image processing apparatus according to claim 1, wherein dots are printed on the print medium by a printing unit ejecting ink from a nozzle array, in which a plurality of nozzles for ejecting ink to print dots on the print medium are arranged in a predetermined direction, on the basis of the second binary data generated by the binarization unit while scanning the nozzle array in a direction crossing to the predetermined direction relative to the print medium, the scanning is performed for printing odd-numbered columns of the crossing direction among a plurality of columns each of which consists of pixels arranged in a direction corresponding to the predetermined direction at the predetermined resolution, and for printing even-numbered columns, to print image on the print medium, and the binarization unit generates the second binary data according to the multivalued level and the dot arrangement pattern such that the number of pixels printed for odd-numbered columns and that of pixels printed for even-numbered columns are substantively-equal.

6. The image processing apparatus according to claim 5 further comprising said printing unit.

7. The image processing apparatus according to claim 1, further comprising:

a gradation level reducing unit configured to convert multivalued input image data to multivalued data having the number of gradations smaller than that of the multivalued input image data; and wherein the obtaining unit obtains the multivalued input image data, and the binarization unit generates binary data specifying dot arrangement in the unit area of the print medium, according to the multivalued data converted by the gradation level reducing unit and other dot arrangement pattern that has larger size than said dot arrangement pattern, specifying printing or non-printing for each of the pixels arranging at the predetermined resolution.

8. The image processing apparatus according to claim 1, further comprising:

a gradation level reducing unit configured to convert multivalued input image data to multivalued data having the number of gradations smaller than that of the multivalued input image data; and wherein the obtaining unit obtains the multivalued input image data, and the binarization unit generates binary data specifying dot arrangement in the unit area of the print medium, according to the multivalued data converted by the gradation level reducing unit and said dot arrangement pattern.

9. An image processing method for forming an image by printing dots on a print medium comprising:

an obtaining step of obtaining first binary data that specifies printing or non-printing of dots in a unit area of the print medium at a predetermined resolution;

a multiplying conversion step of generating multivalued data indicating multivalued level corresponding to a number of dots to be printed in each of the unit areas at lower resolution than the predetermined resolution, according to the number of dots in the unit area of the print medium consisting of a predetermined number of pixels each having the first binary data obtained by the obtaining step; and a binarization step of generating second binary data specifying dot arrangement in the unit area of the print medium at the predetermined resolution, according to the multivalued level of multivalued data generated by the multiplying conversion step for each of the unit area and a dot arrangement pattern specifying arrangement of dots on the print medium corresponding to the multivalued level.

10. The image processing method according to claim 9, wherein at the multiplying conversion step, the number of pieces of data indicating the printing dot in the unit area of the print medium is counted, and thereby the multivalued data corresponding to the unit area is generated according to the first binary data.

11. The image processing method according to claim 9, wherein:

regarding the dot arrangement pattern, a plurality of dot arrangement patterns among which an array of the printing or the non-printing is specified different for a same multivalued level of the multivalued data is prepared; and at the binarization step, one of the plurality of dot arrangement pattern is set in dependence upon the multivalued data and a position of the unit area of the print medium having said multivalued data.

12. The image processing method according to claim 9, wherein dots are printed on the print medium by ejecting ink from a nozzle array, in which a plurality of nozzles for ejecting ink to print dots on the print medium are arranged in a predetermined direction, on the basis of the second binary data generated by the binarization step while moving the nozzle array in a direction crossing to the predetermined direction relative to the print medium, the nozzle array has odd nozzle array and even nozzle array: the odd nozzle array printing for odd-numbered rasters of the predetermined direction among a plurality of rasters each of which consists of pixels arranged in a direction corresponding to the crossing direction at the predetermined resolution: and the even nozzle array printing for even-numbered rasters, and at the binarization step, the second binary data is generated according to the multivalued level and the dot arrangement pattern such that the number of pixels printed by the odd nozzle array and that of pixels printed by the even nozzle array are substantively-equal.

13. The image processing method according to claim 9, wherein dots are printed on the print medium by a printing unit ejecting ink from a nozzle array, in which a plurality of nozzles for ejecting ink to print dots on the print medium are arranged in a predetermined direction, on the basis of the second binary data generated by the binarization step while scanning the nozzle array in a direction crossing to the predetermined direction relative to the print medium, the scanning is performed for printing odd-numbered columns of the crossing direction among a plurality of columns each of which consists of pixels arranged in a direction corresponding to the predetermined direction at the predetermined resolution, and for printing even-numbered columns, to print image on the print medium, and at the binarization step, the second binary data is generated according to the multivalued level and the dot arrangement pattern such that the number of pixels printed for odd-numbered columns and that of pixels printed for even-numbered columns are substantively-equal.

14. The image processing method according to claim 9, further comprising:
a gradation level reducing step for converting multivalued input image data to multivalued data having the number of gradations smaller than that of the multivalued input image data; wherein at the obtaining step, the multivalued input image data is obtained, and at the binarization step, binary data specifying dot arrangement in the unit area of the print medium is generated, according to the multivalued data converted by the gradation level reducing step and other dot arrangement pattern, that has larger size than said dot arrangement pattern, specifying printing or non-printing for each of the pixels arranging at the predetermined resolution.

15. The image processing method according to claim 9, further comprising:
a gradation level reducing step for converting multivalued input image data to multivalued data having the number of gradations smaller than that of the multivalued input image data; and wherein at the obtaining step, the multivalued input image data is obtained, and at the binarization step, binary data indicating dot arrangement in the unit area of the print medium is generated, according to the multivalued data converted by the gradation level reducing step and said dot arrangement pattern.

16. A non-transitory computer readable storage medium which storages computer-executable code of a program for making a computer to perform said image processing method according to claim 9.

* * * * *